(12) United States Patent
Mendenhall (10) Patent No.: US 7,845,726 B2
(45) Date of Patent: Dec. 7, 2010

(54) COMPACTIBLE JUVENILE VEHICLE SEAT

(75) Inventor: Andrew B. Mendenhall, Mooresville, IN (US)

(73) Assignee: Cosco Management, Inc., Wilmington, DE (US)

( * ) Notice: Subject to any disclaimer, the term of this patent is extended or adjusted under 35 U.S.C. 154(b) by 354 days.

(21) Appl. No.: 12/105,851

(22) Filed: Apr. 18, 2008

(65) Prior Publication Data
US 2008/0258526 A1 Oct. 23, 2008

Related U.S. Application Data

(60) Provisional application No. 60/913,211, filed on Apr. 20, 2007.

(51) Int. Cl.
*A47D 1/10* (2006.01)
*B60N 2/02* (2006.01)

(52) U.S. Cl. .............. 297/250.1; 297/378.1; 297/378.12

(58) Field of Classification Search ............. 297/250.1, 297/378.1, 378.12
See application file for complete search history.

(56) References Cited

U.S. PATENT DOCUMENTS

| | | | |
|---|---|---|---|
| 1,641,953 A | 9/1927 | Abraham | |
| 1,742,822 A | 1/1930 | Olson | |
| 3,762,768 A | 10/1973 | Hyde et al. | |
| 4,986,600 A | 1/1991 | Leblanc et al. | |
| 5,121,965 A | 6/1992 | Skold et al. | |
| 5,496,092 A | 3/1996 | Williams et al. | |
| 5,499,860 A | 3/1996 | Smith et al. | |
| 5,647,634 A | 7/1997 | Presser et al. | |
| 5,785,383 A | 7/1998 | Otero | |
| 5,803,543 A | 9/1998 | Hartmann | |
| 6,179,362 B1 | 1/2001 | Wisniewski et al. | |
| 6,767,058 B2 | 7/2004 | McClellan-Derrickson | |
| 6,773,064 B2 | 8/2004 | Treen et al. | |
| 6,840,577 B2 | 1/2005 | Watkins | |
| 6,908,151 B2 | 6/2005 | Meeker et al. | |
| 6,932,429 B2 | 8/2005 | Kamiki | |
| 7,000,985 B2 | 2/2006 | Belgarde | |
| 7,380,878 B2 * | 6/2008 | Clement et al. | 297/256.13 |
| 7,475,941 B2 * | 1/2009 | Clement et al. | 297/255 |
| 7,625,043 B2 | 12/2009 | Hartenstine et al. | |
| 7,637,568 B2 * | 12/2009 | Meeker et al. | 297/250.1 |
| 7,758,120 B2 * | 7/2010 | Zink et al. | 297/250.1 |
| 2004/0061366 A1 | 4/2004 | Meeker et al. | |
| 2004/0124677 A1 | 7/2004 | Meeker et al. | |
| 2004/0189068 A1 * | 9/2004 | Meeker et al. | 297/250.1 |
| 2005/0052059 A1 | 3/2005 | Oto | |
| 2005/0186068 A1 | 8/2005 | Coulson et al. | |
| 2005/0264059 A1 | 12/2005 | Clement et al. | |
| 2005/0264065 A1 | 12/2005 | Clement et al. | |
| 2006/0006712 A1 | 1/2006 | Clement et al. | |
| 2006/0012234 A1 | 1/2006 | Collias | |
| 2006/0138823 A1 | 6/2006 | Huang | |
| 2007/0236061 A1 | 10/2007 | Meeker et al. | |
| 2008/0224507 A1 * | 9/2008 | Zink et al. | 297/250.1 X |
| 2008/0258524 A1 * | 10/2008 | Zink et al. | 297/250.1 |

* cited by examiner

*Primary Examiner*—Rodney B White
(74) *Attorney, Agent, or Firm*—Barnes & Thornburg LLP (57) ABSTRACT

A juvenile vehicle seat includes a seat base adapted to set on a vehicle seat and a foldable backrest associated with the seat base. The juvenile vehicle seat also includes a backrest lock coupled to the foldable backrest.

25 Claims, 6 Drawing Sheets

COMPACTIBLE JUVENILE VEHICLE SEAT

This application claims priority under 35 U.S.C. §119(e) to U.S. Provisional Application No. 60/913,211, filed Apr. 20, 2007, which is expressly incorporated by reference herein.

BACKGROUND

The present disclosure relates to juvenile vehicle seats, and in particular to a vehicle seat having a foldable backrest that moves relative to a seat base. More particularly, the present disclosure relates to a foldable juvenile vehicle seat having a releasable backrest lock.

SUMMARY

A juvenile vehicle seat in accordance with the present disclosure includes a stationary seat base and a seat back including a foldable backrest and a backrest lock. The backrest lock is configured to lock normally the foldable backrest in an upright use position relative to the stationary seat base. The backrest lock can be operated by a caregiver so that the foldable backrest is released and free to move relative to the seat base to assume a compact folded storage position along a top surface of the seat base.

In illustrative embodiments, the foldable backrest includes a latch actuator and a latch normally configured so the latch engages a latch receiver in the seat base. The latch actuator is mounted in the foldable backrest for movement relative to the foldable backrest and to actuate a latch coupled to the foldable backrest. Upward movement of the latch actuator by a caregiver causes the latch actuator to contact the latch and move the latch from an engaged position to a disengaged position freeing the foldable backrest for movement relative to the seat base.

In illustrative embodiments, the foldable backrest includes a pair of pivot posts and a latch post extending from the bottom of the foldable backrest. The pivot posts and latch post are configured to mate with the corresponding pivot-post mounts and latch-post mount included in the seat base to provide support for the foldable backrest and prevent pivoting movement of the foldable backrest.

In illustrative embodiments, a pivot rod is included in the seat base and guides movement of the foldable backrest relative to the seat base between the upright use position and the folded storage position. The pivot rod extends through vertically elongated guide slots formed in the pivot posts allowing the foldable backrest to move vertically and pivot forward relative to the seat base.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying drawings in which:

FIGS. 7-9 illustrate a folding sequence of the foldable backrest after the backrest lock has been disengaged from the latch receiver, the foldable backrest has been lifted vertically and then pivoted forwardly about the pivot axis so that the front of the foldable backrest is pivoted toward the seating surface on the seat bottom;

DETAILED DESCRIPTION

Figure 1:
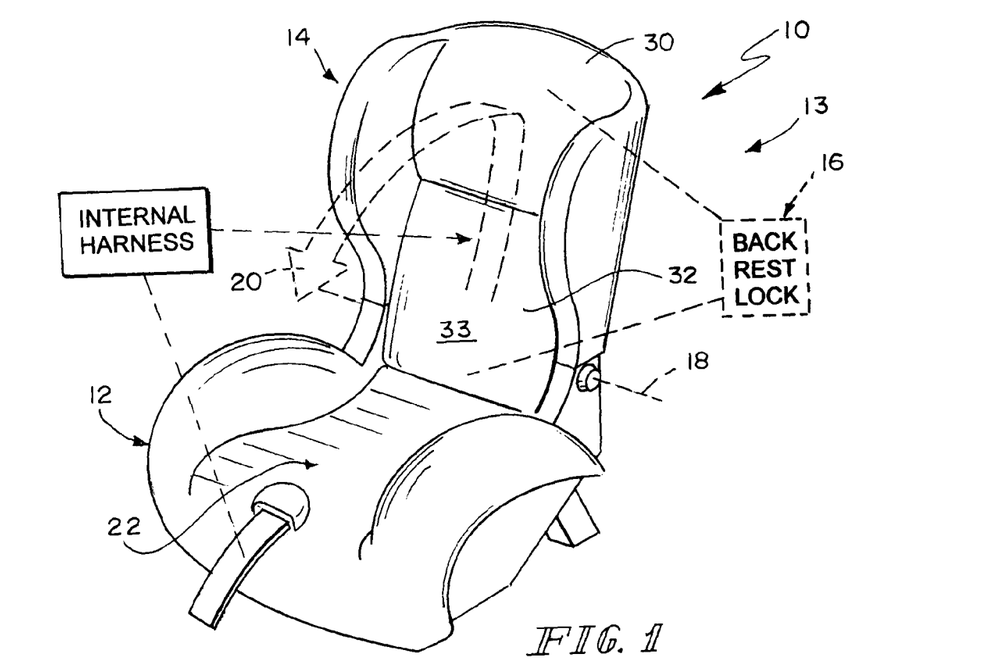
FIG. 1 is a perspective view of a compactible juvenile vehicle seat in accordance with the present disclosure including a seat base and a seat back arranged to extend upwardly from a rear edge of the seat base to lie in an upright use position relative to the seat base.
Figure 2:
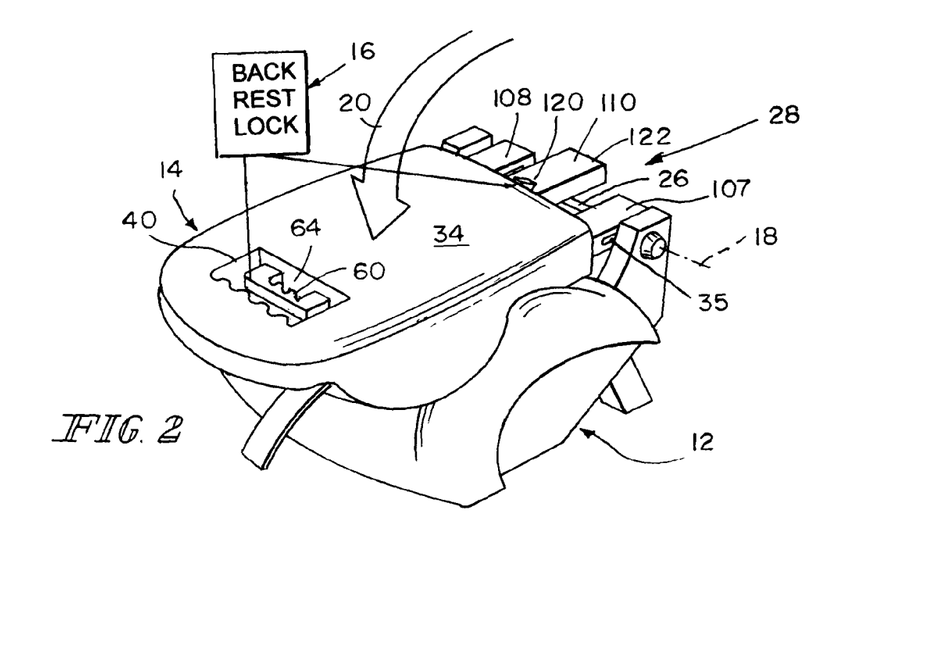
FIG. 2 is a perspective view similar to FIG. 1 showing a foldable backrest included in the seat back after the foldable backrest has been folded forwardly to assume a compact folded storage position above the seat bottom of the seat base.

A juvenile vehicle seat 10 includes a seat base 12 and a seat back 13 as suggested in FIGS. 1 and 2. Seat back 13 includes a foldable backrest 14 coupled to seat base 13 at a pivot axis 18 and a backrest lock 16 coupled to foldable backrest 14 to move therewith as suggested in FIGS. 1 and 2.

Foldable backrest 14 is retained normally in an upright use position as shown in FIG. 1 by a backrest lock 16. Foldable backrest 14 can fold in forward direction 20 relative to seat base 12 about a pivot axis 18 to assume a compact folded storage position (shown in FIG. 2) in response to releasing backrest lock 16 from engagement with seat base 12.

Figure 3:
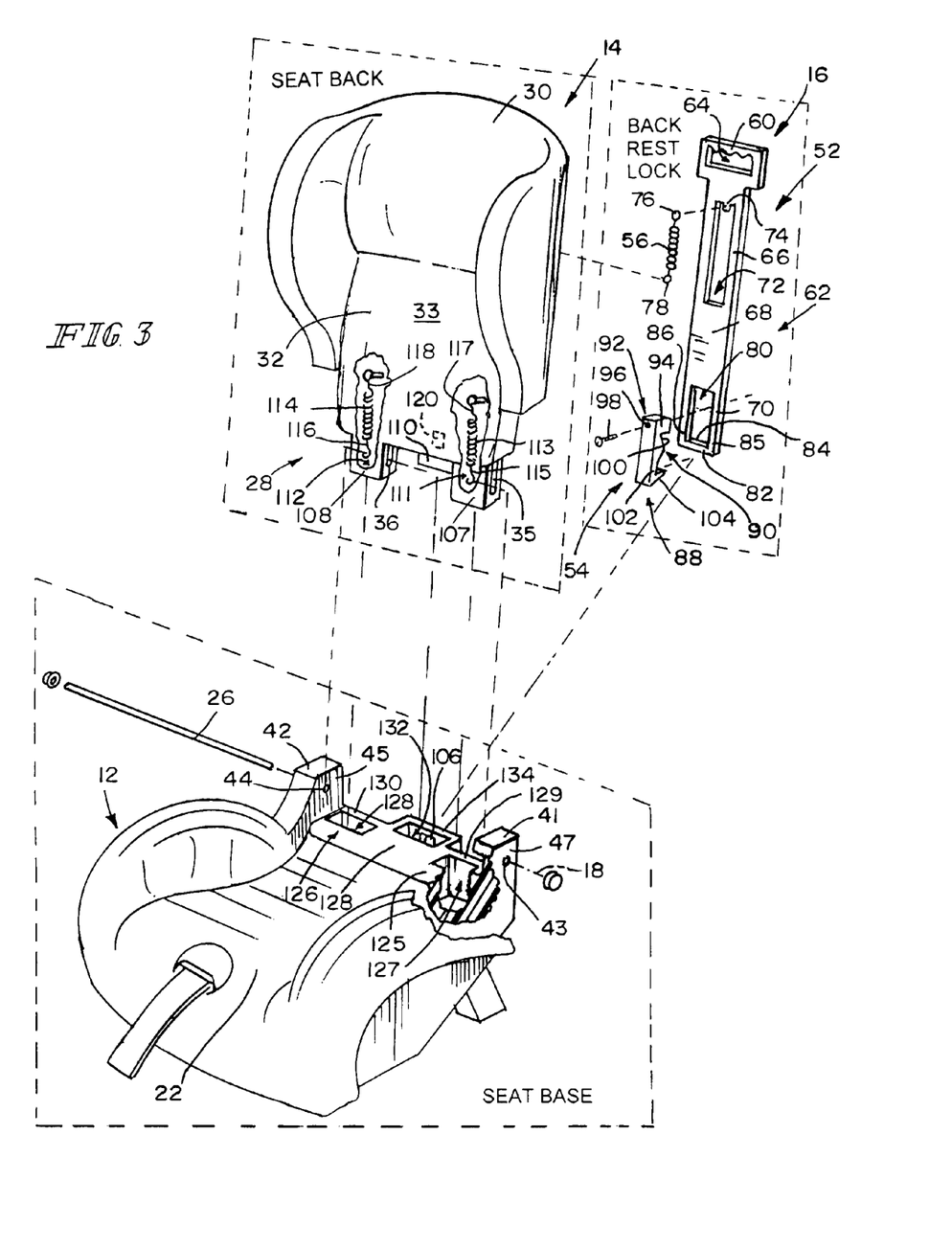
FIG. 3 is an exploded perspective assembly view of the compactible juvenile vehicle seat illustrated in FIGS. 1 and 2, showing that the seat base includes a seat bottom and a pivot rod arranged to mate with the seat bottom to establish a pivot axis about which the foldable backrest can pivot, the seat back includes the foldable backrest configured to mate with the seat bottom and pivot about the pivot axis established by the pivot rod and a pair of pivot springs cooperating to define means for normally urging the foldable backrest in a downward direction relative to the seat bottom and a backrest lock that includes a latch, a latch actuator, and a latch spring arranged to lock the foldable backrest in an upright use position.
Figures 7, 8, 9:
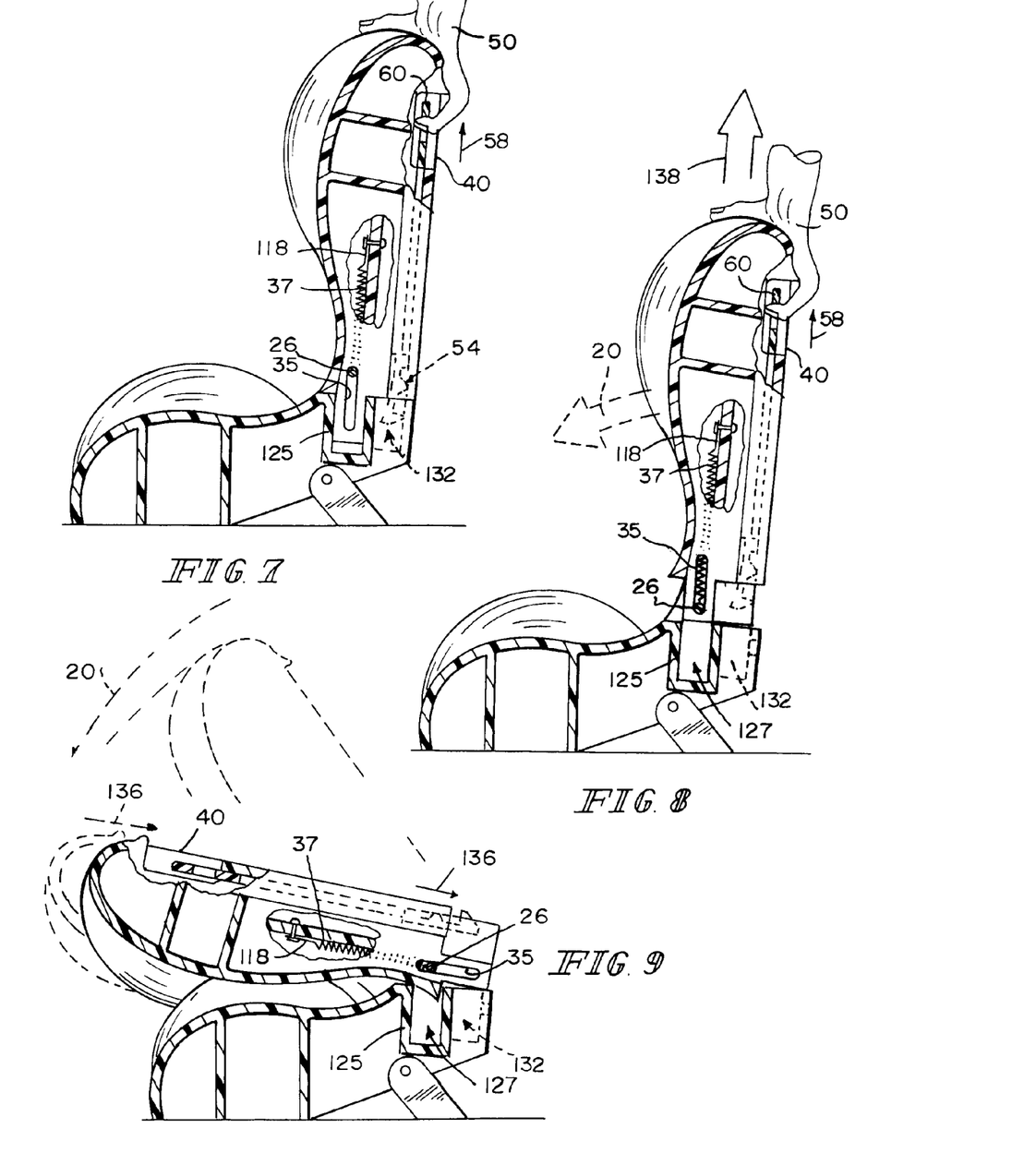
FIG. 7 is a right side elevation view similar to FIG. 1, with portions broken away, showing the latch fully retracted from the latch retainer and in the upright use position.
FIG. 8 is a right side elevation view similar to FIG. 7, with portions broken away, showing the that the adjustable backrest has been lifted vertically and the foldable backrest has been withdrawn from the seat bottom and is ready to be folded forwardly as suggested in FIG. 9.
FIG. 9 is a right side elevation view similar to FIG. 2, with portions broken away, showing the seat back folded forward so that the front face of the foldable backrest is adjacent to the seating surface of the seat bottom and the foldable backrest is further moved rearward due to a force exerted by the pivot post springs to establish the compactible folded juvenile vehicle seat suggested in FIG. 2.

As suggested in FIGS. 1 and 3, seat base 12 is formed to include a seat bottom 22 adapted to seat a juvenile (not shown) thereon, a pivot rod 26 and a backrest-tether mount 24 positioned at the rear of seat bottom 22. Backrest-tether mount 24 is configured to receive a backrest tether included in foldable backrest 14 as shown in FIG. 3. Backrest-tether mount functions to provide support for foldable backrest 14 when in the upright use position and block foldable backrest 14 from pivoting movement when backrest lock 16 is engaged as illustrated in FIGS. 1 and 7.

Pivot rod 26 is included in seat base 12 and supported by a first and second pivot support 41, 42. Pivot supports 41, 42 are spaced apart and positioned to lie on each end of backrest tether mount 24. A pivot-support aperture 43, 44 is formed in each of the pivot support 41, 42 and pivot rod 26 is held in place by passing through pivot-support apertures 43, 44 formed in pivot supports 41,42 as suggested by FIG. 3. Pivot rod 26 establishes pivot axis 18 and functions to connect seat base 12 to foldable backrest 14 to allow pivoting movement about pivot rod 26.

Figure 4:
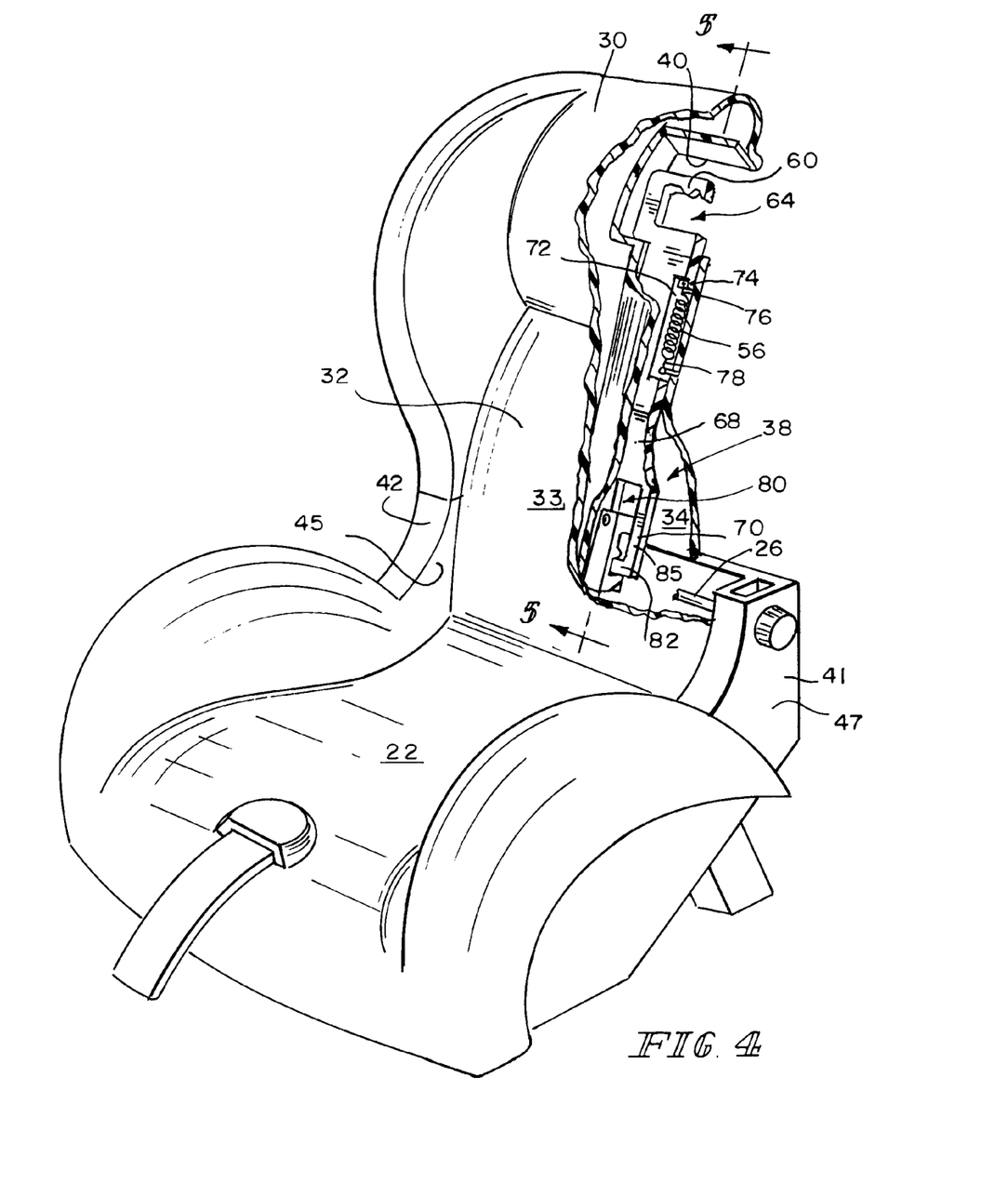
FIG. 4 is a perspective view similar to FIG. 1, with portions broken away, showing the backrest lock is located in the foldable backrest.

As suggested in FIGS. 1, 3, and 4, foldable backrest 14 includes a back support 32, a backrest tether 28, a front surface 33 adapted to face a juvenile resting in the seated position, and an oppositely facing rear surface 34. Back support 32 is adapted to support a back of a juvenile (not shown) resting in the seated position. Backrest tether 28 extends downwardly from back support 32 and is configured to mate with backrest-tether mount 24 as illustrated in FIGS. 2 and 3.

Backrest tether 28, as illustrated in FIG. 3, is configured to mate with backrest-tether mount 24 and is formed to include a first and second guide slot 35, 36 having a vertically elongated shape. Pivot rod 26 extends through guide slots 35, 36 coupling foldable backrest 14 to seat base 12. The shape of guide slots 35, 36 permit foldable backrest 14 to move generally vertical relative to seat base 12 and to move pivotally relative to pivot axis 18. The vertical movement of foldable backrest 14 frees backrest tether 28 from backrest-tether mount 24 and permits pivoting movement of foldable backrest 14 as suggested in FIGS. 7-9.

Front surface 33 and oppositely facing rear surface 34 define a backrest-lock void 38 as suggested in FIGS. 1, 2, and 4. Backrest lock 16 is positioned to lie within backrest-lock void 38 and move within backrest-lock void 38 relative to foldable backrest 14. A handgrip aperture 40 is positioned to lie on oppositely facing rear surface 34 and opening to backrest-lock void 38 to allow a caregiver's hand 50 to access backrest lock 16 as suggested in FIGS. 5 and 6.

Figures 5, 6:
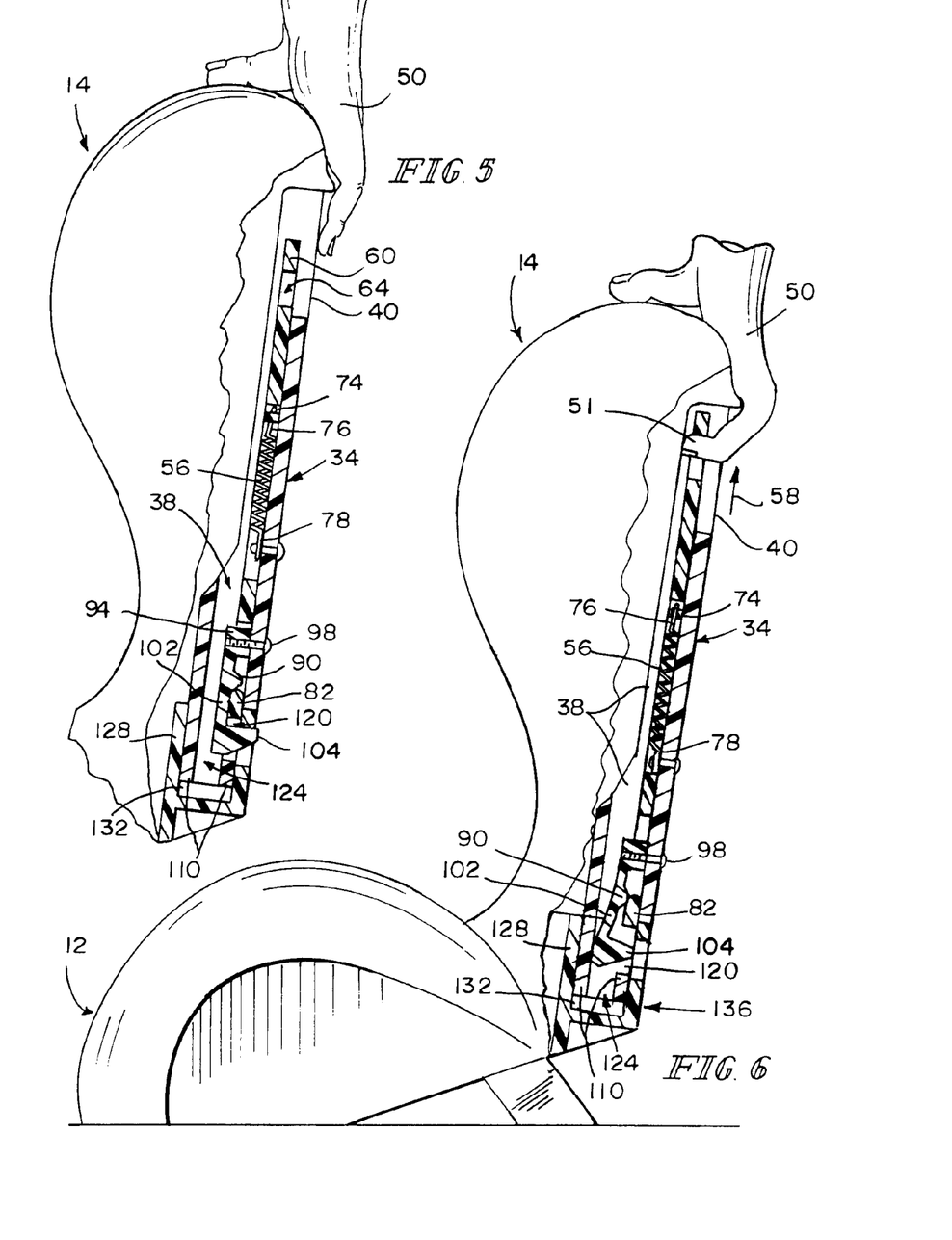
FIG. 5 is a sectional view taken along line 5-5 of FIG. 4, showing a caregiver's hand reaching toward the latch actuator in preparation for moving the latch actuator upwardly to disengage the latch from the latch receiver formed in the seat base as suggested in FIGS. 5a-5c.
FIG. 6 is a right side elevation view similar to FIG. 5 showing the latch actuator in an upper position after the caregiver's hand has moved the latch actuator up retracting the latch from the latch receiver allowing the seat back to be moved vertically and pivot forward about the pivot axis as suggested in FIGS. 7-9.

As shown in FIGS. 5 and 6, backrest lock 16 functions to provide means for retaining foldable backrest 14 in an upright use position and for releasing foldable backrest 14 from engagement with seat base 12 to allow generally vertical and pivoting movement of foldable backrest 14. Backrest lock 16 includes a latch actuator 52, a latch 54, and a latch spring 56. Latch spring 56 is coupled to foldable backrest 14 and latch actuator 52 and is constrained normally to urge the latch actuator lowered position as suggested in FIG. 5.

Figure 5A:
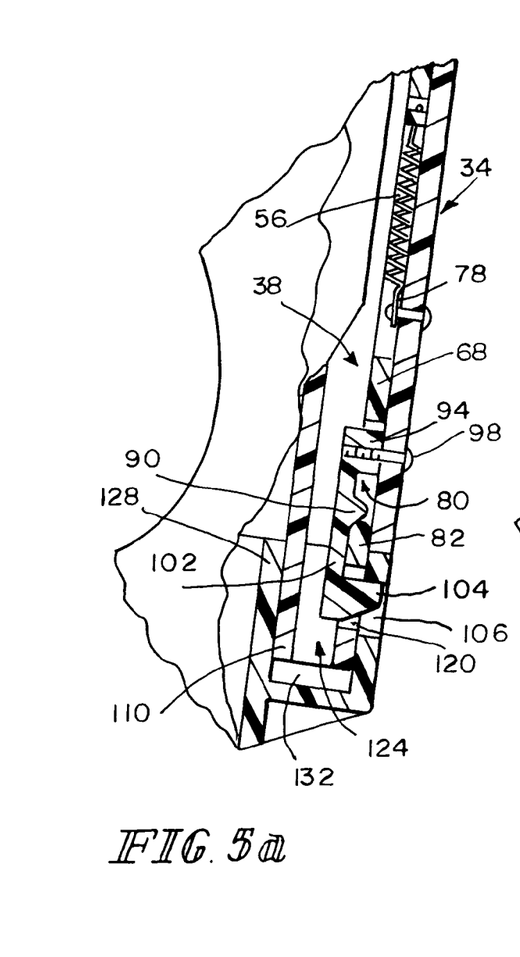
FIG. 5a is a detail view similar to FIG. 5, with portions broken away, showing the latch fully engaged in the latch receiver prior to any upward movement of the latch actuator by the caregiver.
Figure 5B:
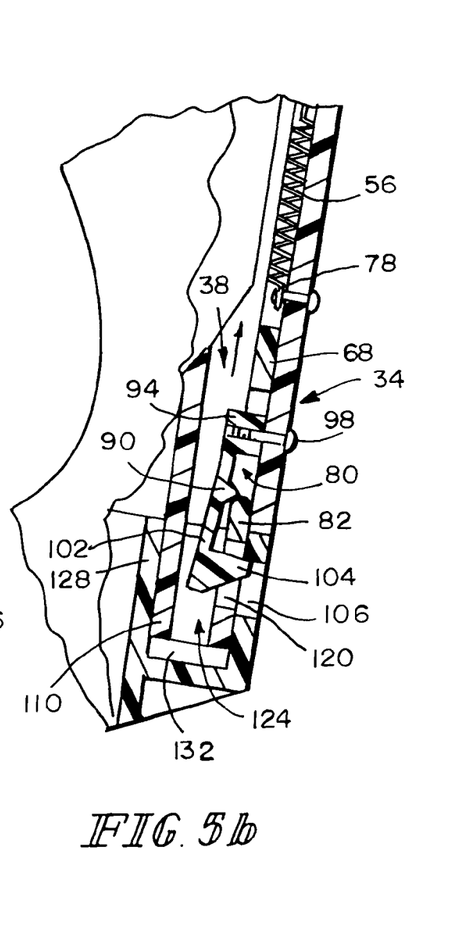
FIG. 5b is a detail view similar to FIG. 5a showing a partial upward movement of the latch actuator and the resulting partial withdrawal of the latch from the latch receiver.
Figure 5C:
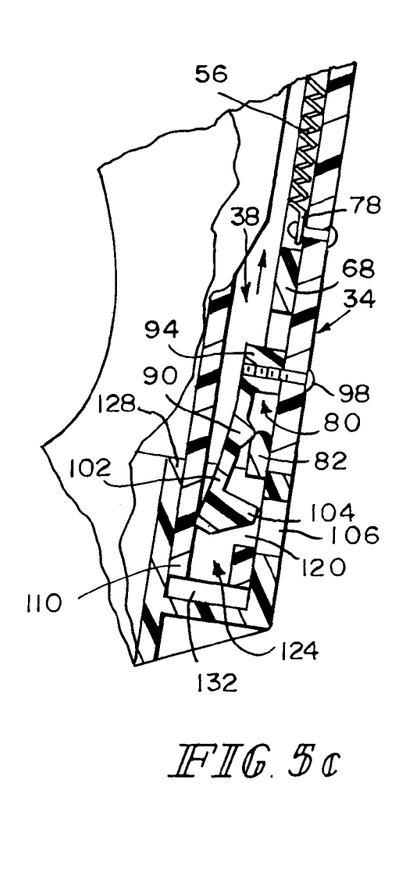
FIG. 5c is a detail view similar to FIG. 5b showing a complete upward movement of the latch actuator and the resulting complete withdrawal of the latch from the latch receiver freeing the foldable backrest for upward movement as suggested in FIG. 8.

Latch actuator 52 functions to provide means for moving latch 52 from an engaged position, where latch 52 is in mating contact with seat base 12 thereby retaining foldable backrest 14, to a disengaged position, where latch 52 does not contact seat base 12 and foldable backrest 14 is released and free to move relative to seat base 12, as illustrated in FIGS. 5a-5c. In use, latch actuator 52 is engaged by a caregiver's hand 50 causing an movement in upward direction 58 causing latch actuator to contact latch 54 urging latch 54 to move from the engaged position to the disengaged position.

Latch actuator 52 includes a handgrip 60 and a latch mover 62 as best shown in FIGS. 3 and 4. Handgrip 60 is coupled to latch mover 62 at the bottom. Handgrip 60 is formed to include a handgrip opening 64 shaped to accommodate a caregiver's fingers 51. Latch mover 62 includes a latch-spring frame 66, a latch-frame support 68, and a latch frame 70. Latch-frame support 68 is positioned to lie between latch-spring frame 66 and latch frame 70.

Latch-spring frame 66, shown in FIGS. 3 and 4, is formed to include a latch-spring aperture 72 and a latch-spring nub 74. Latch-spring aperture 72 is positioned to lie on latch-spring frame 66 and configured so that latch spring 56 is positioned generally vertically in latch-spring aperture 72. Latch-spring nub 74 is positioned to extend downwardly in latch spring aperture and configured so that an upper latch-spring end 76 is coupled by any satisfactory method to latch spring nub 75.

Latch-aperture frame 70 is formed to include a latch aperture 80 positioned to lie on latch-aperture frame 70 and an actuator cam 82 coupled at the bottom of latch-aperture frame. Latch aperture 80 is configured to allow latch 54 to be mounted to foldable backrest 14 by any suitable fastening means and so that latch-aperture frame is positioned lie substantially around latch 54 and latch 54 partly passes through latch aperture 80 as illustrated in FIG. 4.

Actuator cam 82 is positioned so that in response to vertical movement 58 of latch actuator 52, actuator cam engages latch 54 to move latch 54 from the engaged position to a disengaged position. Actuator cam 82 includes a first and second actuator-cam support 85, 86 and a cam-actuator surface 84. Actuator-cam supports 85, 86 are each coupled to one side of latch-aperture frame 70. Actuator-cam surface 84 is positioned to extend upwardly in latch-aperture 80.

Latch 54, as shown in FIG. 3, includes a retainer 88, a retainer mover 90 and a latch mount 92. Retainer mover 90 is positioned to lie between latch mount 92 and retainer 88. Latch mount 92 is coupled to foldable backrest 14 by any suitable means, and illustratively shown in FIG. 3 by a latch fastener 98 passing through a latch-mount hole 96 formed in latch-mount block 94. Retainer mover 90 is coupled to the bottom of latch-mount block 90 and is formed to include a retainer-mover surface 100. Retainer 88 is coupled to the bottom of retainer mover 90 and configured to mate with seat base 12 when latch actuator 52 is in the lowered position.

As suggested in FIGS. 3, 5, and 6, retainer 88 includes a hook support 102 and a hook 104. Hook support 102 couples hook 104 to retainer mover 90. Hook 104 is shaped to mate with a latch retainer 106 included in backrest-tether mount 24 when latch 54 is in the engaged position. Hook 102 is further suitably shaped to allow for disengagement from latch retainer 106.

Retainer-mover surface 100 and actuator-cam surface 84 are shown cooperating in FIGS. 5a-5c. In use, a caregiver's hand 50 actuates latch actuator 52 to a raised position overcoming the latch spring's 56 downward force to cause actuator-surface 84 to engage retainer-mover surface 100 (illustrated in FIG. 5b) and urge retainer 88 to move from the engaged position to the disengaged position.

Backrest tether 28, included in foldable backrest 14, includes a first and second pivot post 107, 108 and a latch post 110. Pivot posts 107, 108 are positioned to lie toward front surface 33 of foldable backrest 14 and spaced apart so that first pivot post 107 is positioned on one side of backrest tether 28 and second pivot post 108 is positioned on the opposite side. Latch post 110 is positioned to lie toward oppositely facing rear surface of foldable backrest 14 and in between pivot posts 107, 108 as shown in FIG. 3.

Pivot posts 107, 108 are formed to include guide slots 35, 36 respectively and pivot rod 26 extends through pivot posts 107, 108 through guide slots 35, 36. Pivot posts 107, 108 are further formed to include an interior pivot-post space 111, 112 as shown in FIG. 3. Guide slots 35, 36 open into interior pivot-post space 111, 112 respectively. Interior pivot-post spaces 111, 112 are formed so that a first and second pivot spring 113, 114 can be positioned in foldable backrest 14.

First and second pivot springs 113, 114, as shown in FIGS. 3, 7, 8, and 9, include an upper pivot-spring end 117, 118 respectively and a lower pivot-spring end 115, 116 respectively. Upper pivot-spring end 117, 118 is coupled to foldable backrest 14 by any suitable means and lower pivot spring end 115, 116 is coupled to pivot rod 26. Pivot springs 113, 114 are coupled to pivot rod 26 to provide feedback to a caregiver's hand 50 when moving foldable backrest 14 from upright use position to compact folded storage position as illustrated in FIGS. 7 and 8.

Latch post 110 is formed to include a latch-post aperture 120 (suggested in FIGS. 2 and 3) and an interior latch-post space 124 as suggested in FIGS. 5 and 6. Latch-post aperture 120 is positioned to lie on a rearward facing latch-post surface 122 and open into latch-post space 124. Rearward facing latch-post surface 122 is parallel to oppositely facing rear surface 34. Retainer 88 is positioned to extend into inter latch-post space 124 and hook 104 is configured to extend through latch-post aperture 120 when latch 54 is in the engaged position.

Backrest-tether mount includes a first and second pivot-post mount 125, 126 and a latch-post mount 128 as shown in FIGS. 3 and 5-9. Pivot post mounts 125, 126 are positioned below pivot axis 18 and spaced apart so that first pivot-post mount 125 is positioned on one side of backrest-tether mount 24 and second pivot-post mount 126 is positioned on the opposite side. Latch-post mount 128 is positioned to lie between pivot-post mounts 125, 126 and substantially along a rear ward surface 136 of seat base 12.

Pivot-post mounts 125, 126 are formed to include an interior-post space 127, 128 respectively and a top aperture 129, 130 respectively opening into interior-post spaces 127, 128 respectively. Top apertures 129, 130 and interior-post spaces 127, 128 are configured to mate with pivot posts 107, 108 and closely sized to provide support when foldable backrest 14 is in the upright use position.

Latch-post mount 128 is formed to include an interior latch-post space 132, a top aperture 134 opening into interior latch-post space 132, and a latch receiver 106 opening into interior latch-post space. Latch receiver 106 is positioned to lie on rearward surface 136 and configured to receive retainer 88 when latch 54 is in the engaged position.

As illustrated in FIG. 5, caregiver's hand 50 is shown reaching into handgrip aperture 40 to engage handgrip 60. Latch spring 56 is in the normally constrained position causing latch 54 to remain in the engaged position. Latch actuator 52 is moved by caregiver's hand 50 as shown in FIG. 6 into the raised position and latch 54 has moved from the engaged position to the disengaged position in response to actuator cam 82 moving upward engaging retainer mover 90. The contact of actuator-surface 84 with retainer-mover surface 100 in response to movement of latch actuator in upward direction 58 is shown in detail in FIGS. 5a-5c.

As illustrated in FIGS. 7-9, foldable backrest 14 is shown moving from the upright use position (FIG. 7) to the compact folded position (FIG. 9). Foldable backrest 14 after movement of latch 54 to the disengaged position is shown in FIG. 7. Movement of foldable backrest 14 in a generally vertical direction 138 to free backrest tether 28 from contact with backrest-tether mount 24 is shown in FIG. 8. Movement of foldable backrest 14 in forward direction 20 toward seat bottom 22 is shown in FIG. 9. After foldable backrest 14 substantially contacts seat bottom 22, pivot springs 113 and 114 urge foldable backrest 14 in a rearward direction 136 to assume the folded compact storage position.

The invention claimed is:

1. A compactible juvenile vehicle seat comprising
a seat base adapted to set on a vehicle seat and formed to include a seat bottom adapted to support a juvenile in a seated position and a pivot rod associated with the seat bottom,
a foldable backrest mounted on the pivot rod for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom,
a backrest lock configured to provide means for retaining the foldable backrest in the upright use position and for releasing the foldable backrest to free the foldable backrest so that, once freed, the foldable backrest can be pivoted about a pivot axis established by the pivot rod to assume the compact folded storage position, wherein the backrest lock includes a latch actuator and a latch, the latch actuator is mounted to the foldable backrest for movement relative to the foldable backrest, the latch is coupled to the foldable backrest to move therewith and to engage the seat base to assume an engaged position in response to downward movement of the latch actuator, the latch is coupled to the foldable backrest to move therewith and to disengage the seat base to assume a disengaged position in response to upward movement of the latch actuator, and latch actuator means for moving the latch from the engaged position to the disengaged position so that the foldable backrest can be released and moved to the compact folded storage position, and
wherein the foldable backrest includes a front surface adapted to face toward a juvenile resting in the seated position on the seat bottom and an oppositely facing rear surface, the front surface is arranged to lie in confronting relation to the seat bottom upon movement of the foldable backrest to the compact folded storage position, and the backrest lock is arranged to lie between the front surface and the oppositely facing rear surface.

2. The compactible juvenile vehicle seat of claim 1, wherein the latch includes a latch mount and a retainer, the latch mount is positioned to lie between the front surface of the foldable backrest and the oppositely facing rear surface of the foldable backrest, and the retainer is positioned to lie in an interior-latch space formed in the seat base.

3. The compactible juvenile vehicle seat of claim 1, wherein the latch includes a retainer mover and a retainer, the retainer mover is positioned to lie between the front surface of the foldable backrest and the oppositely facing rear surface of the foldable backrest, and the retainer is positioned to lie in an interior-latch space formed in the seat base.

4. The compactible juvenile vehicle seat of claim 1, wherein the latch includes a latch mount, a retainer mover, and a retainer, and the retainer mover is positioned to lie between the latch mount and the retainer mover, the latch mount and retainer mover are positioned to lie between the front surface of the foldable backrest and the oppositely facing rear surface of the foldable backrest, and the retainer is positioned to lie in an interior-latch space formed in the seat base.

5. A compactible juvenile vehicle seat comprising a seat base adapted to set on a vehicle seat and formed to include a seat bottom adapted to support a juvenile in a seated position and a pivot rod associated with the seat bottom, a foldable backrest mounted on the pivot rod for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom, a backrest lock configured to provide means for retaining the foldable backrest in the upright use position and for releasing the foldable backrest to free the foldable backrest so that, once freed, the foldable backrest can be pivoted about a pivot axis established by the pivot rod to assume the compact folded storage position, wherein the backrest lock includes a latch actuator and a latch, the latch actuator is mounted to the foldable backrest for movement relative to the foldable backrest, the latch is coupled to the foldable backrest to move therewith and to engage the seat base to assume an engaged position in response to downward movement of the latch actuator, the latch is coupled to the foldable backrest to move therewith and to disengage the seat base to assume a disengaged position in response to upward movement of the latch actuator, and latch actuator means for moving the latch from the engaged position to the disengaged position so that the foldable backrest can be released and moved to the compact folded storage position, and wherein the latch actuator means includes a handgrip and latch mover coupled to the handgrip to move therewith and the latch actuator further includes a latch spring coupled to the latch mover, the foldable backrest, and constrained normally and yieldably to urge the latch into the engaged position.

6. The compactible juvenile vehicle seat of claim 5, wherein the latch mover includes a latch-spring frame formed to include a latch-spring aperture positioned to lie on the latch-spring frame and a latch-spring nub is coupled to the latch-spring frame to cause the latch-spring nub to extend downwardly in the latch-spring aperture and a latch-aperture frame formed to include a latch aperture positioned to lie on the latch-aperture frame and an actuator cam coupled to the latch-aperture frame to cause the actuator cam to extend upwardly in the latch aperture.

7. The compactible juvenile vehicle seat of claim 6, wherein the latch mover further includes a latch-frame support positioned to lie between the latch-spring frame and the latch-aperture frame and the latch-frame support is coupled to the latch-spring frame and the latch frame to move therewith.

8. The compactible juvenile vehicle seat of claim 6, wherein the actuator cam includes an actuator-cam support coupled to the latch-aperture frame support to move therewith and an actuator-cam surface configured to contact the latch and urge the latch to move from an engaged position to a disengaged position in response to an upward movement of the latch actuator.

9. The compactible juvenile vehicle seat of claim 5, wherein the latch includes a latch mount coupled to the foldable backrest to move therewith and a retainer configured to mate with the seat base when the latch is in the engaged position.

10. The compactible juvenile vehicle seat of claim 9, wherein the latch further includes a retainer mover and the retainer mover is configured to cooperate with the latch mover in response to the upward movement of the latch actuator to urge the retainer to assume the disengaged position.

11. The compactible juvenile vehicle seat of claim 10, wherein the retainer includes a hook and a hook support coupled to the hook and the hook is configured to mate with the seat base and to disengage from the seat base in response to movement of the retainer mover.

12. The compactible juvenile vehicle seat of claim 1, wherein the foldable backrest includes a back support and a backrest tether configured to mate with the seat base to support the foldable backrest in the upright use position.

13. The compactible juvenile vehicle seat of claim 12, wherein the backrest tether includes a pivot post coupled to the foldable backrest, arranged to extend downwardly from a bottom surface of the foldable backrest, and the pivot post cooperates with the pivot rod to cause the foldable backrest to assume a folded storage position and a latch post arranged to extend downwardly from the bottom surface of the foldable backrest and cooperate with the backrest lock to engage the seat base.

14. The compactible juvenile vehicle seat of claim 13, wherein the pivot post includes a front pivot-post surface adapted to face toward a juvenile resting in the seated position on the seat bottom and an oppositely facing rear pivot-post surface, the pivot post further includes a guide slot extending through the pivot post in between the front pivot-post surface and the oppositely facing rear pivot-post surface, and the guide slot is configured so that the pivot rod extends through the pivot post.

15. The compactible juvenile vehicle seat of claim 14, wherein the foldable backrest further includes a pivot spring, the pivot spring includes an upper pivot-spring end coupled to the foldable backrest and a lower pivot-spring end coupled to the pivot rod and the pivot spring is constrained normally to provide feedback to a caregiver when moving the foldable backrest.

16. The compactible juvenile vehicle seat of claim 13, wherein the latch post includes a front latch-post surface adapted to face toward a juvenile resting in the seated position on the seat bottom and an oppositely facing rear latch-post surface, the latch post is formed to further include a latch-post aperture positioned to lie on the oppositely facing rear latch-post surface, and the latch extends through the latch-post aperture when the latch is in the engaged position.

17. A compactible juvenile vehicle seat comprising a seat base adapted to set on a vehicle seat and formed to include a seat bottom adapted to support a juvenile in a seated position and a pivot rod associated with the seat bottom, a foldable backrest mounted on the pivot rod for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom, a backrest lock configured to provide means for retaining the foldable backrest in the upright use position and for releasing the foldable backrest to free the foldable backrest so that, once freed, the foldable backrest can be pivoted about a pivot axis established by the pivot rod to assume the compact folded storage position, wherein the backrest lock includes a latch actuator and a latch, the latch actuator is mounted to the foldable backrest for movement relative to the foldable backrest, the latch is coupled to the foldable backrest to move therewith and to engage the seat base to assume an engaged position in response to downward movement of the latch actuator, the latch is coupled to the foldable backrest to move therewith and to disengage the seat base to assume a disengaged position in response to upward movement of the latch actuator, and latch actuator means for moving the latch from the engaged position to the disengaged position so that the foldable backrest can be released and moved to the compact folded storage position, and wherein the seat base further includes a backrest-tether mount, wherein the backrest-tether mount includes a pivot-post mount and a latch-post mount configured to mate with the foldable backrest when the backrest is in the upright use position.

18. The compactible juvenile vehicle seat of claim 17, wherein the foldable backrest includes a back support and a backrest tether configured to mate with the backrest-tether mount to support the foldable backrest in the upright use position.

19. The compactible juvenile vehicle seat of claim 18, wherein the backrest tether includes a pivot post coupled to the foldable backrest, arranged to extend downwardly from a bottom surface of the foldable backrest, and the pivot post cooperates with the pivot rod to cause the foldable backrest to assume a folded storage position and a latch post arranged to extend downwardly from the bottom surface of the foldable backrest and the latch post cooperates with the backrest lock to engage the backrest-tether mount.

20. The compactible juvenile seat of claim 19, wherein the pivot-post mount is formed to include an interior-post space and further formed to include a top aperture opening into the interior-post space.

21. The compactible juvenile seat of claim 19, wherein the latch-post mount is formed to include an interior-latch space, further formed to include a top aperture opening into the interior-latch space, and further formed to include a latch receiver and the latch receiver is configured to receive the latch when the latch is in the engaged position.

22. A compactible juvenile vehicle seat comprising a seat base adapted to set on a vehicle seat and formed to include a seat bottom adapted to support a juvenile in a seated position and a pivot rod associated with the seat bottom, a foldable backrest mounted on the pivot rod and adapted to support a juvenile in the seated position on the seat bottom and a compact folded storage position arranged to extend along the seat bottom and lie in confronting relation to the seat bottom, a backrest lock coupled to the foldable backrest and configured to engaged the seat base, pivot means for allowing movement the foldable backrest to cause the foldable backrest to assume the compact folded storage position in response to disengagement of the seat base by the backrest lock, and wherein the pivot means includes a backrest tether coupled to the foldable backrest to move therewith and the pivot rod coupled to the seat base, the backrest tether includes a guide slot configured to allow generally vertical movement of foldable backrest from an upright lowered position to an upright raised position and allow the foldable backrest to pivot about a pivot axis established by the pivot rod when the foldable backrest is in the upright raised position.

23. The compactible juvenile vehicle seat of claim 22, wherein the seat base further includes a pivot support coupled to the seat bottom and the pivot support includes a first pivot-support surface and a second pivot-support surface spaced apart from the first pivot-support surface and is oriented to face in a direction along the pivot axis.

24. The compactible juvenile vehicle seat of claim 22, wherein the first pivot-support surface is formed to include a first pivot-support aperture positioned to lie on the pivot axis, the second pivot-support surface is formed to include a second pivot support aperture positioned to lie on the pivot axis, and the pivot rod extends through the first pivot-support aperture and through the second pivot-support aperture.

25. The compactible juvenile vehicle seat of claim 22, wherein the backrest lock includes a latch actuator coupled to the foldable backrest to move therewith and a latch coupled to the foldable backrest to move therewith, the latch is configured to engage the seat base after the latch actuator has moved downwardly, the latch is further configured to disengage the seat base after the latch actuator has moved upwardly.

* * * * *